Aug. 13, 1946.  F. H. TABER  2,405,802
TIRE RETREADING
Filed Oct. 8, 1943  3 Sheets-Sheet 1

INVENTOR.
FREDERIC H. TABER
BY
ATTORNEY

Aug. 13, 1946. F. H. TABER 2,405,802
TIRE RETREADING
Filed Oct. 8, 1943 3 Sheets-Sheet 2
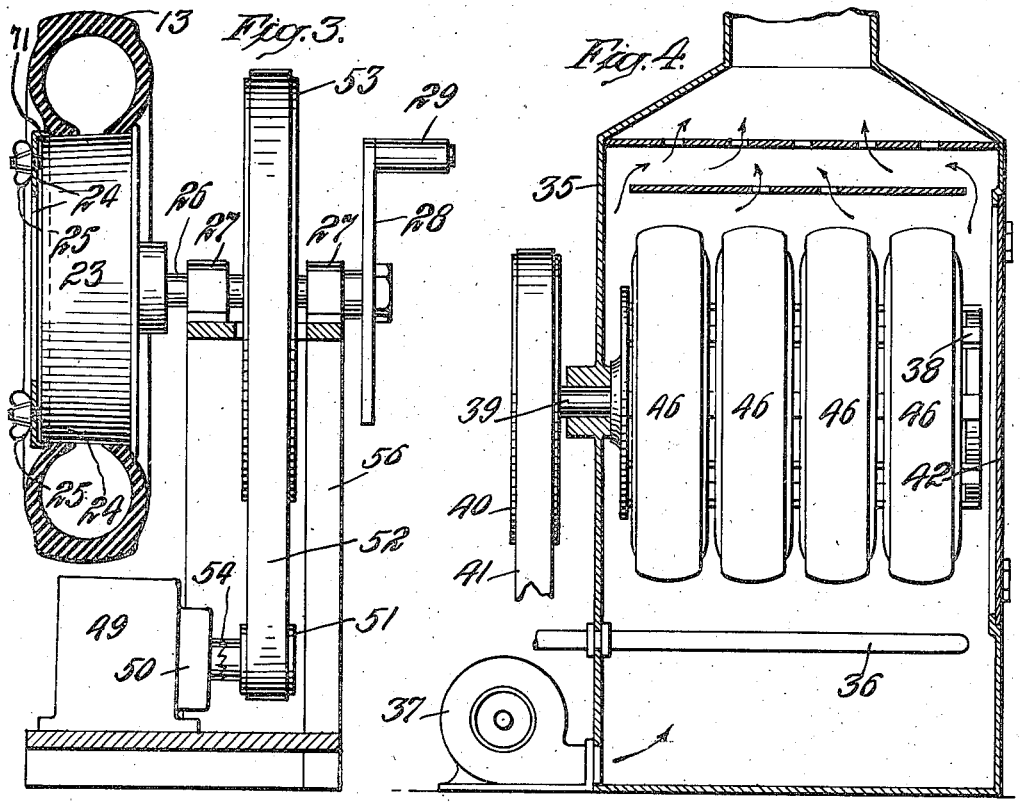
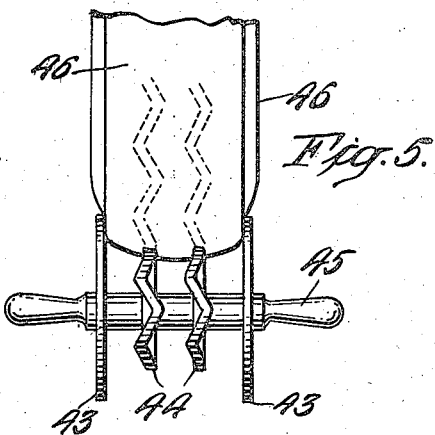
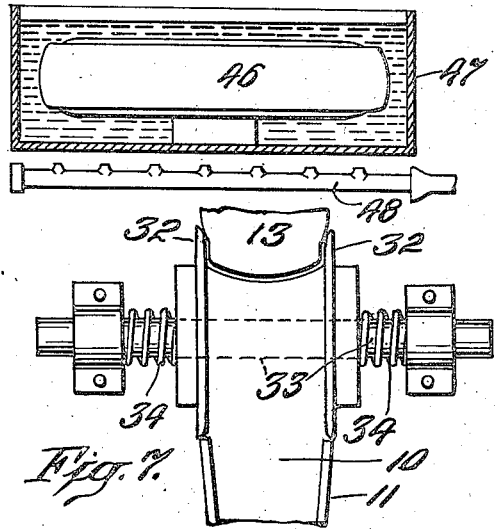
INVENTOR.
FREDERIC H. TABER
BY
ATTORNEY

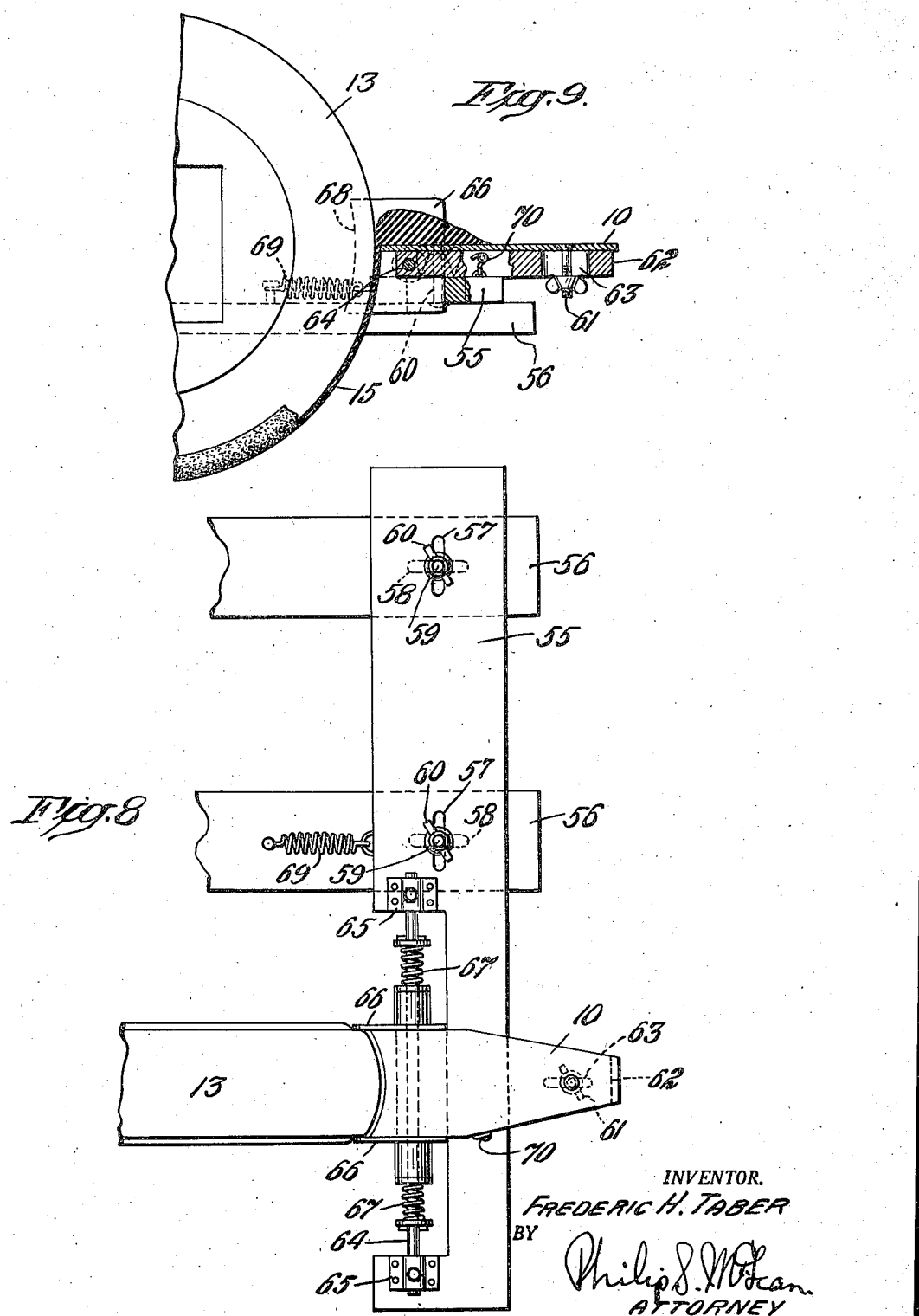

Patented Aug. 13, 1946

2,405,802

UNITED STATES PATENT OFFICE 2,405,802

TIRE RETREADING

Frederic H. Taber, New Bedford, Mass.

Application October 8, 1943, Serial No. 505,571

3 Claims. (Cl. 18—59)

The invention herein disclosed relates to the surfacing and resurfacing of the tread or wearing portions of vehicle tires and is a continuation in part of that disclosed in copending patent application Ser. No. 469,746 filed December 18, 1942, now Patent 2,368,172 of January 30, 1945.

Special objects of the invention are to provide a tough, resilient, abrasive resistant coating or covering for the tread or road contact wearing surfaces of used or worn tires, which will combine with and become a unitary part of the tire structure and which will be economical, easily applied and practical in every way.

Further objects of the invention are to effect the application of surface coatings to worn tires and thereby to obtain additional usage and mileage and conserve essential materials.

Other important objects of the invention are to provide simple, practical and efficient equipment for applying such coatings and which will be of a nature as to be readily operable by ordinary unskilled labor.

Heretofore, it has been customary to recap used tires by scraping and regrooving and otherwise evening the worn tire surface by a long tedious process and through the use of heavy equipment. After the surface has been thus dressed, a heavy strip of rubber is wrapped around the tire and the tire is then inflated through the use of an air bag and the entire assembly is put in a watch case mold. At present, plantation rubber for such use is critical and the amount of available equipment and experienced help is distinctly limited, so that a method for resurfacing tires quickly by inexperienced labor and with apparatus which can be readily constructed is most desirable. The invention accomplishes these purposes and other desirable objects.

The drawings accompanying and forming part of the specification illustrate one practical embodiment, but the invention is not to be understood as restricted to the particular details shown, the method and structure both being capable of modification and change all within the true intent and broad scope of the invention as hereinafter defined and claimed.

Fig. 3 is a vertical sectional view as on substantially the plane of line 3—3 of Fig. 1.

Fig. 4 is a vertical sectional view of a form of drying chamber in which the coated tires may be slowly rotated to prevent "draping" of the applied coating.

Fig. 5 is a broken detail showing use of a hand tool for impressing grooves in the applied tread material.

Fig. 6 is a broken sectional view of a form of hot water tank for effecting the final curing of the coating material.

Fig. 7 is a broken plan view of a modified form of template having side rollers for gaging and smoothing the coating at the shoulders of the tread.

Fig. 8 is a plan view of another form of adjustable template construction and Fig. 9 is a broken part sectional side elevation of the same.

Figure 1:
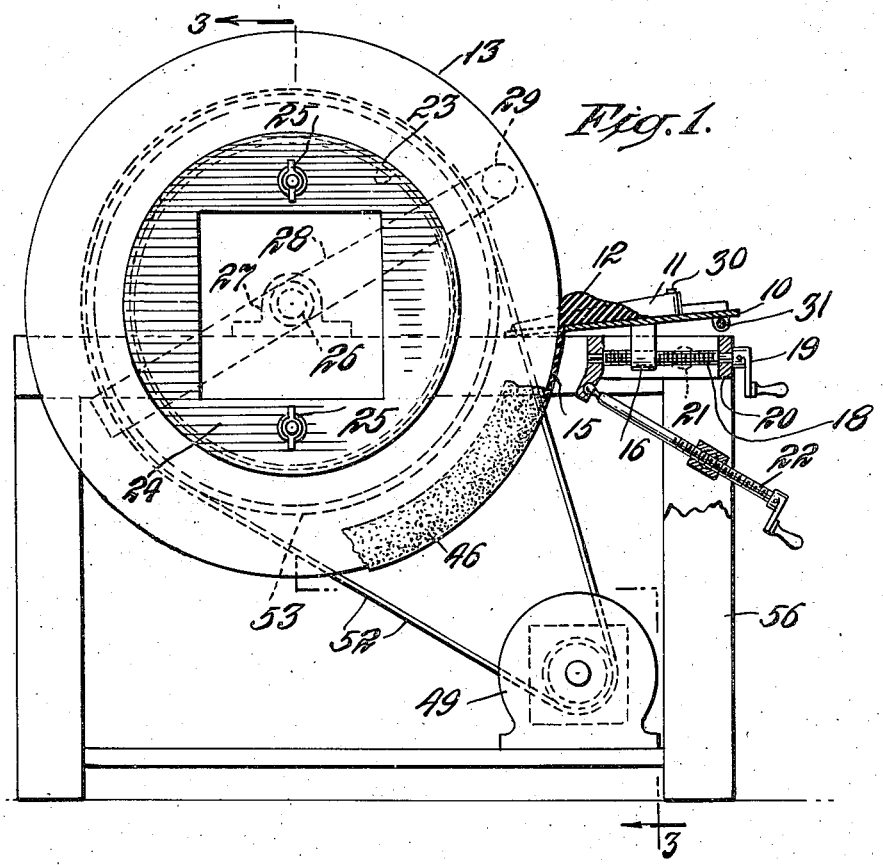
Fig. 1 is a broken side and part sectional view illustrating a form of apparatus for applying the coating material to a tire.

The drawings and description are illustrative of means by which a gasoline service station or other commercial servicing agency may inexpensively carry on the rapid coating or retreading of used tires. The best distribution of material is obtained by mounting the tire on a wheel and turning the wheel while the coating is being applied, by means of a knife or a template in angled relation against the coated surface. In such circumstances, the turning wheel may greatly aid in producing a smooth uniform surface. Roughly applied coatings however, may have some certain advantages, in some instances, providing better traction than those finished too smoothly.

Non-skid or other designs may be impressed in the applied tread material when a proper drying stage has been reached as by pressing circular disc members of desired configuration into the new tread surface to the depth desired, while the tire is being revolved. The surface tackiness of the tire may be reduced by the use of talc after the drying process has continued for a short time.

The constituents of the tread forming coating may vary with supplies available and may be governed to an extent by the availability of what are usually considered low-grade, off-grade or wild resin rubbers, such as guayule, cryptostegia grandiflora and others, compounded according to the best known art, but in any circumstances, including a vulcanizing agent such as sulphur and usually in addition an accelerator or accelerators, a pigment or pigments and anti-oxidants.

This invention takes advantage of the fact that these wild rubbers, with their high resin content, will produce compounds which are soluble in small amounts of available low boiling point naphthas, so as to form heavy doughs or putty-like cements which are nearly free from nerve and which are readily applicable by spreading with a template over against the wearing surface of a tire.

These so-called low-grade, off-grade or wild resin rubbers, such as guayule may also be combined wtih Buna S (G. R.-S.) and other types of synthetic rubbers or with ordinary rubbers to form coatings which can be satisfactorily applied to tires by the apparatus herein disclosed. These rubbers or combinations also may be dissolved in appropriate solvents as described in the preceding paragraph to form a coating material, the essential requirement being that the material to be so used be sufficiently plastic to pass between the template and the tire and capable of being forced upon and into the surface of the tire by the pressures developed at that point.

An illustration of a suitable compound possessing excellent wearing qualities is as follows:

| | Pounds |
|---|---|
| Guayule | 4.25 |
| Zinc oxide | 0.13 |
| Carbon black | 0.75 |
| Phenyl-beta naphthylamine | 0.04 |
| Sulphur | 0.15 |

These materials are milled together and then churned with sufficient naphtha having a boiling range of 150° F.–250° F., so as to make a dispersed solution of one gallon. The above highly viscous dough-like cement is capable of long time storage without deterioration or without appreciable change, but is not ready for immediate application to the tire. There should accompany this cement a measured amount of ultra-accelerator. For one gallon of the illustrated cement, it is necessary to add an ultra-accelerator or fast curing agent, such as Butyl 8, 0.38 lb., just before applying to the tire. In the event that the cement is not to be used promptly, it is possible to make up the cement with all the ingredients, except for the Butyl 8, which latter may be mixed in by stirring by hand at any time just prior to use of the cement in the coating of the tire. This procedure allows for manufacture of the cement in commercial quantities and the supply of same to service stations or to individual users, for application, when required.

Before the coating material is applied, it is necessary that the surface of the tire be free from dirt, gum, resins, tar or other contaminants. Such foreign materials may be removed by a dressing operation involving abrading the surface of the tire and by washing the surface areas with gasoline or other solvent. Abrasion of the tire surface provides increased adhesion and therefore results in longer life and wearing of the coating applied.

Areas having excessive wear caused by unsatisfactory alignment, improper balancing or other faults common to tires need not receive special attention, as such areas ordinarily will be completely filled with the coating compound over the low spots by the special apparatus herein described.

One quick and easy method of applying the coating is to rotate the tire in close proximity to a holder shaped to confine a layer of the medium against the face of the tire tread.

Figure 2:
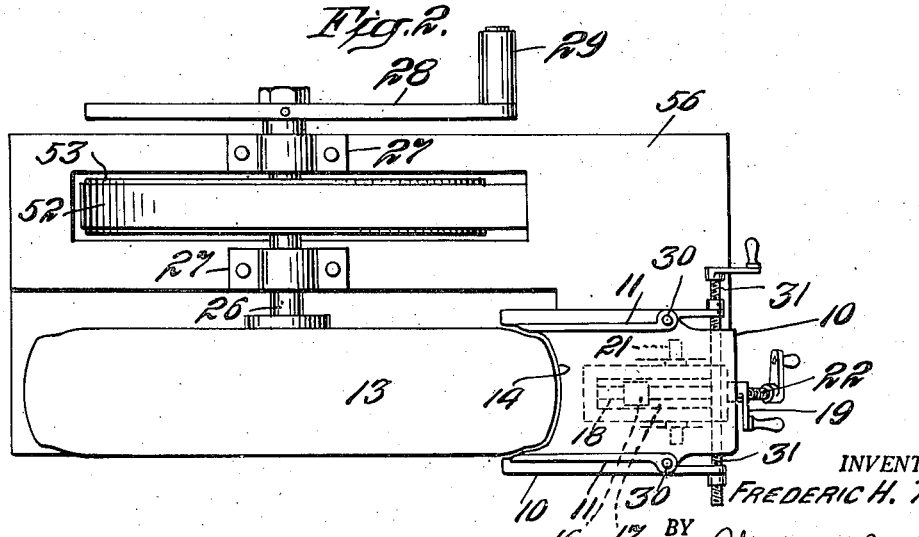
Fig. 2 is a top plan view showing particularly features of the adjustable template governing thickness of the applied layer.

In Figs. 1, 2 and 7, such holding and confining means is shown in the form of an inclined tray 10, having flanges 11, at the edges for confining a body of the cementitious material 12, against the tread portion of a tire 13, said tray having its edge concaved at 14, to closely approximate the tire contour and thus to act as a gage and pressure element defining and limiting the thickness of the applied layer or layers 15.

To enable setting the device as an accurate template, the tray 10, is shown as supported and carried by a block 16, sliding in a guide slot 17, said block riding a screw 18, which can be turned by handle 19, to advance the tray toward or withdraw it away from the tire.

Further, the frame 20, forming the mounting for the tray and screw adjusting mechanism is shown pivotally supported at 21, so that it may be tilted to position the tray at different angles to the axis of the tire and a hand screw 22, is shown connected with this tiltable frame for adjusting and securing the template in different angular relations.

The tire is conveniently mounted for rotation by engaging it over a slightly bevelled mandrel 23, Fig. 3 and temporarily securing it thereon by a clamp plate 24, fastened by wing bolts 25. This mandrel is shown fixed on a shaft 26, journalled in bearings 27, and having a lever 28, and hand crank 29, or other means for turning it.

An amount of material in excess of that which at the moment can pass between the template and tire may be placed on the template where it may take the form of a roll, as the tire is rotated. The material thus squeezed between the template and the tire is worked into the tire with a rolling, shearing, squeezing and kneading action. The considerable shearing force thereby applied contributes materially to the satisfactory adhesion of the tread coating and this action also eliminates or minimizes trapped air. The thickness of the layer or layers applied may be determined by adjustment of the hand screw 18. The tire may be turned a number of times after the desired thickness of coating has been applied, to assure a firm and uniform smoothing of the coating in place. For this smoothing operation, the template may be set at the proper incline to apply pressure without scraping off any of the applied material.

To enable use of a cement of higher viscosity than would otherwise be possible, the material, before application to the tire, may be heated to temporarily reduce viscosity, as by placing a supply of it in a can, in hot water, or otherwise.

As particularly shown in Fig. 2, the side flanges 11, of the template may closely approximate and, if desired, engage both the side walls of the tire so as to taper the coating down to a feather edge at the opposite sides of the tire shoulders. These confining flanges may be adjustable for tire size and side pressure, as by pivotally mounting them over the template at 30, and providing a hand screw at 31, for swinging the flanges on their pivots to approach them toward or separate the front ends of the same in respect to the tire sides.

In the form of the template shown in Fig. 7, substantially the same effect is accomplished by having flat discs 32, at the inner ends of the side flanges pivoted on shaft 33, and pressed against the sides of the tire by springs 34.

After the application of the desired full thickness of the wearing material, the solvent in the material is evaporated by drying.

The drying may be accomplished in a special chamber such as represented at 35, Fig. 4, having steam coils 36, or other heating means and a blower or other air circulating means 37.

A special feature of this drier is the provision of a rotary drum 38, on which one or more of the tires may be mounted. This drum is shown carried by shafting 39, having a pulley 40, at the outside of the housing, driven by a belt 41. The tires may be placed on or be removed from the rotary support by way of a door 42, in the side of the drier opposite the drum.

The drying may be effected ordinarily by revolving the coated tire at a slow speed of about eight to twelve revolutions per minute, either at room temperatures or at a temperature of around 100° F. The higher the temperature, the less time necessary for evaporation of the solvent. The use of air flow also reduces the drying time.

The rotation while drying, accomplishes an even, uniform drying effect, reduces the time required and possibly of greatest importance, prevents the coating, while still viscous, from running toward the bottom and draping into eccentric form or starting to separate from the tire.

The drying may take from a few hours to ten or twelve hours, or more, depending upon the thickness of the coating, the temperature, the use or absence of air flow, the rate of rotation and other factors.

At a time during this drying stage when the coating has become non-sticky, any desired non-skid or other particular formation may be pressed in the tire.

In Fig. 5, a hand tool is shown comprising larger outer discs 43, and smaller intermediate discs 44, rotatably engaged in spaced relation upon a handle bar 45, which can be pressed against the coated tire 46, while being rotated. Some or all of these discs may be corrugated, as in the case of the intermediate discs here to impress a zigzag or other desired outline in the tread surface.

When the solvent has sufficiently evaporated from the coating, the tire may be cured, as by vulcanizing in a watch case mold or by simple immersion in water heated to around 200° F. for about forty-five minutes. By the addition of suitable chemicals to raise the boiling point, the time for treating the tire in the water may be shortened. Thus for example, by the addition of calcium chloride, the curing time may be reduced from approximately forty-five minutes to about twenty-five minutes.

In Fig. 6, a suitable hot water immersion tank is illustrated at 47, heated by a gas burner 48.

Hot air, steam, or other heating media may be employed, but the hot water immersion method illustrated, provides a simple and satisfactory way of solidifying and permanently unifying and toughening the coating within a reasonable time and with freedom from all complicated or expensive apparatus. The actual time required will depend largely on the thickness of the applied coating and temperature employed.

The rubbery coating in curing, change its character from a soft putty-like consistency to a firm, resilient, tough, rubbery character with satisfactory abrasive qualities and high tensile strength.

After removal from the vulcanizing water bath, the resurfaced tire is ready for use as soon as cooled and the cooling may require only a short time.

Guayule rubber, either alone or in combination with other synthetic rubbers is preferred, because of its characteristically great adhesiveness, stickiness and tenacity. Although guayule combinations are preferred, the invention is not limited to such materials. Adhesiveness may be improved, in some cases, by incorporating special resins or plasticizers. Compounded and treated as described, the applied layer is in effect bonded to the tire body to such an extent that it will wear right down to the original surface. The applied layer may be one half inch more or less in thickness, depending upon the size of the tire and the use to which it is to be subjected. Although this layer may be applied through any number of revolutions of the tire, there is no laminating effect or tendency to lay the material on in laminations which might tend to separate with wear and flexure of the tire. The coating is a single homogeneous mass integrally united with the body of the tire.

The adhesive character of the coating compounded as described, is such that it may be spread and forced into the interstices of cracked, abused or worn side walls, as well as to the tread surface and this use is within the meaning, intent and scope of the invention. Conventional methods of recapping do not satisfactorily repair such side wall defects. In fact, the additional press-curing of conventional recapping accentuates any existing side wall cracks.

While possibly preferable to carry out the drying in a separate heated closed blast chamber, such as illustrated in Fig. 4, the invention contemplates also drying in the open air and possibly right on the machine on which the coating is applied.

For such purposes, the tire may be left in position on the mandrel 23, and the latter slowly rotated until the coating is sufficiently dry. The hand crank 29, provides one means for effecting such rotation, but it is preferred, under such circumstances, to have the machine equipped with a power drive, such as that afforded by a motor 49, driving through reduction gearing at 50, a pulley 51, carrying a belt 52, running over pulley 53, on the mandrel shaft 26. This set of slow speed drive connections may include a throw-out clutch 54, and this may be a slip clutch which will permit the shaft to be turned or stopped at any time by the hand lever 28, regardless of the operation of the motor.

The hand lever 28, is shown extending to opposite sides of the shaft center to enable use of both hands for turning the tire against the pressure applied by the template through the mass of coating material squeezed in the gap between the template and surface of the tire. The angle or incline of the template, approximately radially of the tire, maintains a converging wedge-like crevice into which the material is drawn and squeezed with great force against and into the natural pores and the slight interstices and irregularities formed in the preparatory abrasion step. After this forceful pressure-adhesion is effected any minor irregularities may be ironed out by continuing the rotation with the template left in the same position or possibly inclined at a different angle and/or slightly backed off from the tire. While such hand rotation may usually be preferred, it is contemplated that the motor drive may be employed for the coating operation. If desired, the reduction gearing may be of the change speed type and be employed for turning the tire at one rate while the coating material is being applied and at a different rate when rotation is continued thereafter for a longer period for drying the solvent and preventing draping.

When employing a template of the type illustrated in Fig. 7, where spring pressed side rolls or discs 32, actually engage the sides of the tire, the template itself may be mounted for laterally shifting movement and be held centered by such rolls and springs.

The apparatus required is relatively simple and inexpensive as compared with that necessary for recapping and similar operations and the method may be carried out without previous training or special skill. The invention is suited to volume production as well as to occasional repair jobs. In the case of volume production, the coating material in the plastic state could be supplied in a more or less continuous flow as required, as by means of a supply pipe leading from a pressure mixer to the tire mounting stand and terminating in a pressure nozzle which may have a mouth portion conformed to the contour of the tread portion of the tire.

To enable quick and easy adjustment of the template to a tire which has been positioned on the mandrel, the template may be carried by a beam or bar 55, Fig. 8 adjustably mounted on the table or bench structure 56, which carries the mandrel shaft and forms the base of the machine. The bar and the table top are shown as having crossed slots 57, 58, through which clamp bolts 59 extend. Upon loosening the wing nuts 60, on these bolts, the bar may be adjusted longitudinally, that is parallel with the axis of the tire or transversely, that is, toward or away from the rim of the tire, thus to bring the template 10, which is mounted on the bar, into proper registry with the tread portion of the tire.

The template in this case is shown as a flat plate secured by a wing nut and bolt connection 61, on top of a supporting block 62, the latter being slotted at 63, to enable adjustment of the plate toward and away from the tire.

The block 62 is shown pivotally and slidably engaged on a shaft 64, adjustably secured in bearings 65.

Plates 66, slidably engaged on the shaft are yieldingly pressed by the springs 67, against opposite edges of the template. These plates, as shown in Fig. 9, have curved forward edges 68, to substantially match the shoulders of the tire at opposite sides of the tread.

A spring is indicated at 69, for pulling the template supporting bar toward the tire, to assist in the initial adjustment of the bar or, to tension the template toward the tire while the machine is in operation. A hook is indicated at 70, for holding the template supporting block 62, down on the table top and to prevent it from being tilted upward by the downward pressure on the forward end of the same.

In using this form of template, the bar carrying the template can be quickly adjusted to properly set the template against the tread of the tire. Then if there is any misalignment of the tire on the mandrel, the springs 67, will yield to permit the template to accurately "follow" the tread under the guidance of the side plates 66, engaging the shoulders of the tire.

To insure a proper holding and grip of the tire on the mandrel, the clamp plate 24, may be provided with an inwardly extending flange 71, to engage the outer bead of the tire seated on the mandrel. Then by tightening the screws 25, enough pressure may be applied to assure a firm grip of the tire over the tapered supporting surface of the mandrel.

The application of the coating as disclosed, actually strengthens and improves the body structure of the tire. Hence, after an applied coating has been worn down to some extent or right down to the original tire surface, a new coating may be applied and thus the total useful life of the tire be prolonged more or less indefinitely.

While at present it appears that the template works best disposed substantially radially of the tire as in Fig. 9, it is realized that the angle of the template to the tire may be varied. This angle can be changed in the last construction described by permitting the supporting block to rock about the supporting center 64. In such a construction this can be accomplished upon releasing the hook holding the template block down on the supporting bar.

In some instances, it may be considered desirable to smooth the coating down in place on the tire, as by means of correspondingly shaped pressure rolls or the like. In such case, the tire may be rotated while the smoothing and evening pressure is being applied as through properly shaped rollers or pressing forms. Talc may be applied at such a time to overcome any surface tackiness of the freshly applied coating. In addition to the smoothing and evening action, this applied pressure may be of additional benefit in rubbing and working the material while setting, into firm, uniform condition.

While possibly of greatest importance as a retreading operation, the invention contemplates the applying of a tread forming coating under any circumstances, possibly even to the extent of applying such a coating direct to a tire carcass, that is, the tire body before any tread surface has been applied.

Because of the broad scope of the invention, the terms employed herein are to be considered as used in a descriptive rather than in a limiting sense, except possibly as limitations may be imposed by state of the prior art.

What is claimed is:

1. The herein disclosed method of retreading a tire, which comprises mounting a tire on a rotatable support, rotating said support and while so rotating, maintaining said tire forcibly in rubbing engagement with a supported body of sticky, cohesive, vulcanizable rubber compound, to build up a layer of such compound on the tire surface, solidifying said forcibly applied sticky material to a firm non-sticky but impressionable condition, impressing desired configuration into the applied coating, while rotating the support and tire and vulcanizing the applied layer with the design impressed therein.

2. The herein disclosed method of retreading a tire which comprises preparing a viscous, sticky, cohesive, dough-like rubber composition, mounting a tire to be retreaded on a rotatable support, providing a template having a concave edge portion of the approximate contour of the tread portion of the tire, supporting said template in stationary relation at one side of the axis of the rotatable support and with the concave edge of the same defining a narrow, crescent shaped crevice about the crown and sidewall portions of the tire, placing a body of the sticky, dough-like rubber composition on the template over and in the crescent shaped crevice about the tire and then rotating the rotatable support in the direction toward the composition on the template and thereby causing said tire to forcibly drag, squeeze, knead, wedge and press substantial composition through said crevice on, into and about the crown and sidewall formation of the tire and then, after building up a tread thickness of the material on the tire in the manner described, continuing slow rotation of the support for a time sufficient to solidify the originally sticky composition to a firm, non-sticky condition and to insure even distribution and prevent draping of the material while changing from the dough-like to the solid, firm condition.

3. The herein disclosed method of retreading a tire which comprises preparing a viscous, sticky, cohesive, dough-like rubber composition, mounting a tire to be retreaded on a rotatable support, providing a template having a concave edge portion of the approximate contour of the tread portion of the tire, supporting said template in stationary relation at one side of the axis of the rotatable support and with the concave edge of the same defining a narrow, crescent shaped crevice about the crown and sidewall portions of the tire, placing a body of the sticky, dough-like rubber composition on the template over and in the crescent shaped crevice about the tire and then rotating the rotatable support in the direction toward the composition on the template and thereby causing said tire to forcibly drag, squeeze, knead, wedge and press said composition through said crevice on, into and about the crown and sidewall formation of the tire and then solidifying the applied originally sticky composition to a non-sticky, firm condition by rotating the tire within a heated chamber.

FREDERIC H. TABER.